United States Patent
Mitra et al.

(10) Patent No.: US 10,303,462 B2
(45) Date of Patent: May 28, 2019

(54) WINDOWS SUPPORT OF A PLUGGABLE ECOSYSTEM FOR UNIVERSAL WINDOWS APPLICATION STORES

(71) Applicant: Microsoft Technology Licensing, LLC, Redmond, WA (US)

(72) Inventors: Sarjana Sheth Mitra, Bealvaue, WA (US); John James Vintzel, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/610,326

(22) Filed: May 31, 2017

(65) Prior Publication Data

US 2018/0349131 A1    Dec. 6, 2018

(51) Int. Cl.
| | | |
|---|---|---|
| G06F 9/445 | (2018.01) | |
| G06F 8/70 | (2018.01) | |
| G06F 8/65 | (2018.01) | |
| G06F 8/61 | (2018.01) | |

(52) U.S. Cl.
CPC ............... *G06F 8/70* (2013.01); *G06F 8/61* (2013.01); *G06F 8/65* (2013.01)

(58) Field of Classification Search
CPC ........................................................ G06F 8/70
USPC ........................................................ 717/173
See application file for complete search history.

(56) References Cited

U.S. PATENT DOCUMENTS

| | | | | | |
|---|---|---|---|---|---|
| 6,023,586 | A * | 2/2000 | Gaisford | ............... | G06F 8/60 707/999.01 |
| 6,151,643 | A * | 11/2000 | Cheng | ............... | G06F 8/62 709/200 |
| 8,261,231 | B1 | 9/2012 | Hirsch et al. | | |
| 9,002,864 | B1 | 4/2015 | Payne | | |
| 9,239,713 | B1 | 1/2016 | Lakshman et al. | | |
| 9,319,270 | B2 | 4/2016 | Bestmann et al. | | |
| 9,325,795 | B2 | 4/2016 | Kim et al. | | |
| 9,542,172 | B2 * | 1/2017 | Alsina | ............... | G06F 8/65 |

(Continued)

FOREIGN PATENT DOCUMENTS

WO         2014096553 A1      6/2014

OTHER PUBLICATIONS

Warren, Tom, "Windows 10 can run reworked Android and iOS apps", http://www.theverge.com/2015/4/29/8511439/microsoft-windows-10-android-ios-apps-bridges, Published on: Apr. 29, 2015, 11 pages.

(Continued)

*Primary Examiner* — Wei Y Zhen
*Assistant Examiner* — Lanny N Ung
(74) *Attorney, Agent, or Firm* — Arent Fox LLP

(57) ABSTRACT

A method and apparatus comprises identifying, by an application platform operating on a device, one or more application stores and one or more applications operating on the device, the one or more application stores being configured as a respective source for each application operating on the device, determining one or more application store privileges for each of the one or more application stores operating on the device, each application store privilege providing a respective application store with management capabilities over the one or more applications, and performing, for each application store, one or more operations specific to the application store based on the one or more application store privileges and one or more application program interfaces (APIs) specific to the application store.

20 Claims, 6 Drawing Sheets

(56) References Cited

U.S. PATENT DOCUMENTS

| | | |
|---|---|---|
| 2008/0235659 A1 | 9/2008 | Manglik et al. |
| 2010/0192070 A1* | 7/2010 | Peckelbeen ............. G06F 9/454 715/748 |
| 2011/0145341 A1 | 6/2011 | Hampel |
| 2011/0258301 A1* | 10/2011 | McCormick ............ H04L 67/34 709/222 |
| 2013/0067448 A1* | 3/2013 | Sannidhanam ........... G06F 8/60 717/169 |
| 2013/0205277 A1* | 8/2013 | Seven ........................ G06F 8/38 717/121 |
| 2013/0326499 A1* | 12/2013 | Mowatt ..................... G06F 8/60 717/177 |
| 2015/0095905 A1 | 4/2015 | Chakrabarti et al. |
| 2016/0205115 A1 | 7/2016 | Kulkarni et al. |

* cited by examiner

WINDOWS SUPPORT OF A PLUGGABLE ECOSYSTEM FOR UNIVERSAL WINDOWS APPLICATION STORES

BACKGROUND

Implementations of this disclosure relate generally to wireless communication networks, and more particularly to integrating a third party application store with an operating system of a device.

Application users want their experiences to be mobile across all of their devices, and they want to use whatever device is most convenient or productive for the task at hand. A universal platform that runs on many different devices, such as personal computers, tablets, smartphones, and game consoles, makes it easier to support a number of screen sizes, and a variety of interaction models, such as touch, mouse and keyboard, game controller, or pen. Universal applications (e.g., Universal Windows Applications) can be written for a universal platform.

The universal applications target device families, not a particular operating system. The device family identifies the application program interfaces (APIs), system characteristics, and behaviors that developers can expect across devices within the device family. Developers can work with familiar programming languages, frameworks, and APIs, all in single project, and have the very same code run on a wide range of hardware. Once the developer has written their universal application, they can publish it to an application store for users to access. The device family determines the set of devices on which the universal application can be installed from the store.

The universal applications are packaged and distributed using a universal platform packaging format. All universal applications are distributed as the universal platform package. This provides a trustworthy installation mechanism and ensures that the applications can be deployed and updated seamlessly.

The universal platform provides a common application platform that is available on every device. With this evolution, applications that target the universal platform can call not only the APIs that are common to all devices, but also APIs that are specific to the device family that the application is running on. The universal platform provides a guaranteed core API layer across devices. This means developers can create a single application package that can be installed onto a wide range of devices.

In current platforms, developers who want to build durable content are required to release that content within the application itself. The application logic is more complex when the developer releases content in the application but includes restrictions on enabling that content, such as when users must pay for content or when content is made available only after a certain point in time or after a certain point in a game is achieved. For users, this means every piece of content added, regardless of if the user actually purchased that content, is downloaded to their device, which consumes network bandwidth and disk space. Furthermore, the user is also forced to receive updates to the content they do not intend or expect to ever use.

To create downloadable content or some optional content, current platforms requires developers to make an update to the main application. This makes it especially difficult for publishers who contract application content out to third parties to provide optional content since this content require updating the application itself.

However, current platforms do not allow for third party application stores to distribute universal applications on a Windows device, and to include all of the third party application stores' primary functions, such as, install and update for the universal applications. These limitations make it difficult for developers to license or otherwise monetize additional or optional content and applications. Thus, improvements in integration of third party application stores with an operating system of a device is desired.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

In accordance with an implementation, a method includes integrating a third party application store with an operating system of a device. The described implementations include identifying, by an application platform operating on a device, one or more application stores operating on the device, the one or more application stores being configured as a respective source for each application operating on the device. The described implementations further include determining one or more application store privileges for each of the one or more application stores operating on the device, each application store privilege providing a respective application store with management capabilities over the one or more applications. The described implementations further include performing, for each application store, one or more operations specific to the application store based on the one or more application store privileges and one or more application program interfaces (APIs) specific to the application store.

In an implementation, an apparatus for integrating a third party application store with an operating system of a device may include a memory, and a processor communicatively coupled to the memory and configured to identify, by an application platform operating on a device, one or more application stores and one or more applications operating on the device, the one or more application stores being configured as a respective source for each application operating on the device. The described implementations further determine one or more application store privileges for each of the one or more application stores operating on the device, each application store privilege providing a respective application store with management capabilities over the one or more applications. The described implementations further perform, for each application store, one or more operations specific to the application store based on the one or more application store privileges and one or more APIs specific to the application store.

In an implementation, a computer-readable medium may store computer executable code for integrating a third party application store with an operating system of a device is described. The described implementations include code for identifying, by an application platform operating on a device, one or more application stores and one or more applications operating on the device, the one or more application stores being configured as a respective source for each application operating on the device. The described implementations further include code for determining one or more application store privileges for each of the one or more application stores operating on the device, each application store privilege providing a respective application store with management capabilities over the one or more applications. The described implementations further include code for performing, for each application store, one or more operations specific to the application store based on the one or more application store privileges and one or more APIs specific to the application store.

In an implementation, an apparatus for integrating a third party application store with an operating system of a device is described. The described implementations include means for identifying, by an application platform operating on a device, one or more application stores and one or more applications operating on the device, the one or more application stores being configured as a respective source for each application operating on the device. The described implementations further include means for determining one or more application store privileges for each of the one or more application stores operating on the device, each application store privilege providing a respective application store with management capabilities over the one or more applications. The described implementations further include means for performing, for each application store, one or more operations specific to the application store based on the one or more application store privileges and one or more APIs specific to the application store.

Various implementations and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

DRAWINGS

To further clarify the above and other advantages and features of implementations of the present disclosure, a more particular description of implementations of the present disclosure will be rendered by reference to the appended drawings. It is appreciated that these drawings depict only typical implementations of the disclosure and are therefore not to be considered limiting of its scope. The disclosure will be described and explained with additional specificity and detail through the use of the accompanying drawings in which.

DETAILED DESCRIPTION

Figure 1:
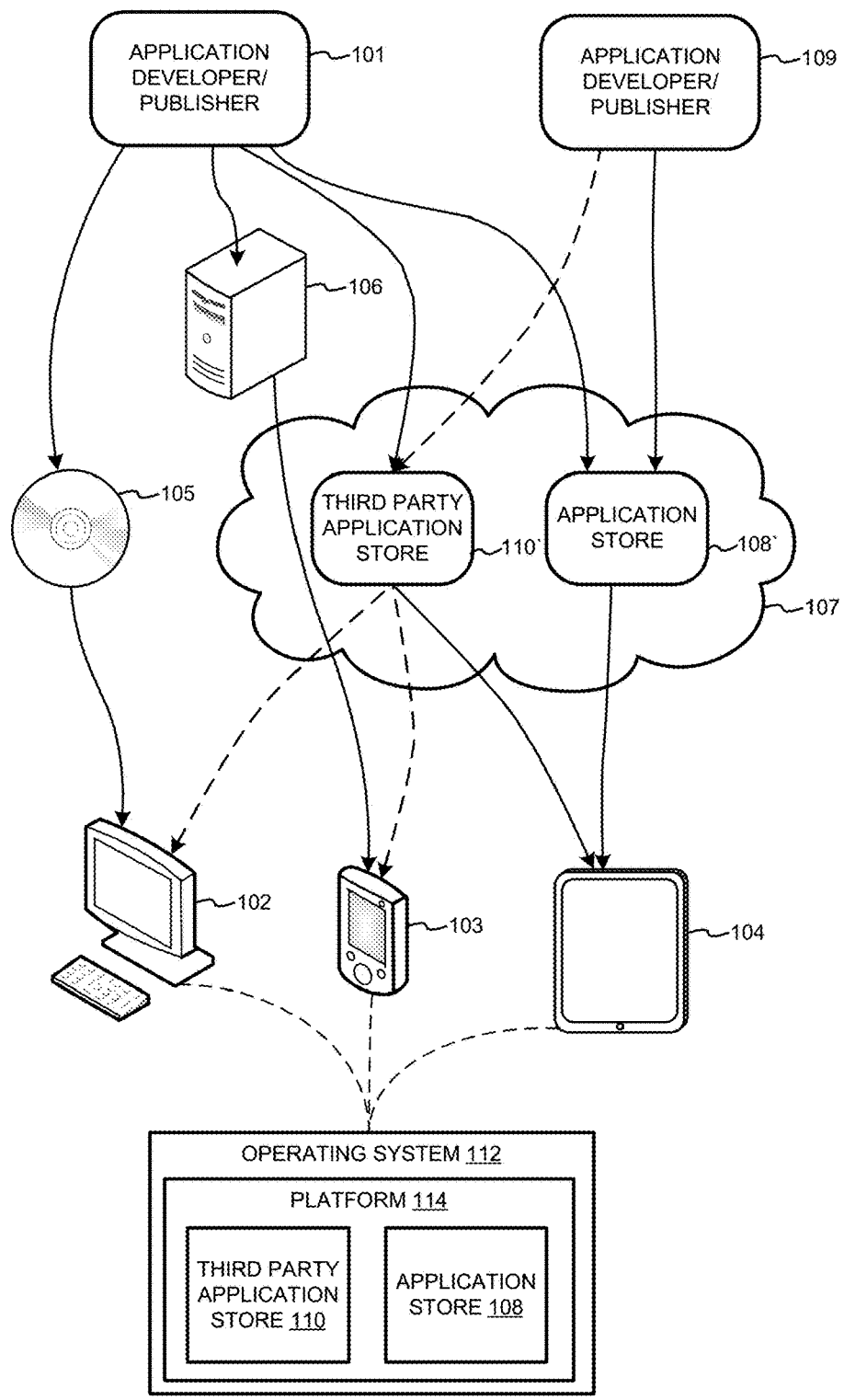
FIG. 1 is a block diagram of a system for distributing universal applications that are composed of one or more sub-component universal applications via third party application stores, and integrating a third party application store with an operating system of a device.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In an implementation, the term "component" as used herein may be one of the parts that make up a system, may be hardware or software, and may be divided into other components.

The present implementations generally relate to integrating a third party application store with an operating system of a device. A main universal application (e.g., Universal Windows Applications) can be composed of multiple universal applications, each with their own identity, entitlement, language resources, etc. that provide additional functionality to the main universal application. Each additional universal application may be managed (e.g., installed, updated, uninstalled, moved, and stored) independently. All of the universal applications run under the context of the main universal application. For example, the application data is written under the main universal application's data folder. Furthermore, this model allows for multiple publishers to collaborate on a single universal application experience wherein different parts can be made by different publishers while being distributed as a single logical application. Furthermore, developers may create optional universal applications that work with multiple main universal applications from different developers. For example, downloadable content, such as maps or songs, may be used by multiple game applications from different publishers.

In an example, third party application stores correspond to application stores that are provided by a vendor other than the manufacturer of the device. However, current platforms of an operating system do not allow for third party application stores to distribute universal applications on a Windows device, and to include all of the third party application stores' primary functions, such as, install and update for the universal applications. These limitations make it difficult for developers to license or otherwise monetize additional or optional content and applications that are sourced from third party application stores. Moreover, applications sourced from third party application stores are not integrated fully integrated (resulting in failures to update, etc.) with the operating system since the third party application stores are not fully integrated. As such, improvements are needed corresponding to the integration of third party application stores with the operating system of the device.

Accordingly, in some implementations, the present methods and apparatuses may provide an efficient solution, as compared to conventional solutions, by integrating a third party application store with an operating system of a device. In the present implementations, an application platform operating on a device may identify one or more application stores and one or more applications operating on the device, the one or more application stores being configured as a respective source for each application operating on the device. Further, the present implementations provide one or more mechanisms for determining one or more application store privileges for each of the one or more application stores operating on the device, each application store privilege providing a respective application store with management capabilities over the one or more applications. Further, the present implementations provide one or more mechanisms for performing, for each application store, one or more operations specific to the application store based on the one or more application store privileges and one or more APIs specific to the application store.

FIG. 1 is a block diagram of a system for integrating a third party application store with an operating system of a device and distributing universal applications that are composed of one or more sub-component universal applications. For example, the system may include end-user devices, such as a personal computer 102, smartphone 103, or tablet 104, each of which may include an operating system 112. The operating system 112 may include, in a layer of the operating system 112, a platform 114 which may be configured to integrate at least a third party application store 110 with the operating system 108. In an example, third party application store 110 and application store 108, operating on one of end-user devices 102, 103, or 104, may access the third party application store 110 and application store 108, respectively, via network 107 and download desired universal applications.

In an implementation, platform 114 may identify one or more application stores and one or more applications operating on the device. For example, the one or more application stores, such as third party application store 110 and application store 108, are configured as a respective source for each application operating on the device. In this example, application store 108 and/or third party application store 110 correspond to applications operating on a device that link to application store 108' and/or the third party application store 110', respectively, via network 107 and download desired universal applications. Platform 114 may determine one or more application store privileges for each of the one or more application stores operating on the device. For example, each application store privilege provides a respective application store with management capabilities over the one or more applications. Further, platform 114 may perform, for each application store, one or more operations specific to the application store based on the one or more application store privileges and one or more APIs specific to the application store. As described in further detail, platform 114 may perform one or more application store-specific operations related to application development and packaging, installation and updating of applications, remediation of applications, in-application deployment related actions, telemetry for applications, and out of box experience (OOBE).

In an implementation, the sub-component universal applications provide additional functionality to the main universal application. The sub-component universal applications have their own identity, entitlement, and resources. An application developer or publisher 101 creates the main universal application and/or associated optional universal applications. The main and optional universal applications are distributed to end-user devices, such as a personal computer 102, smartphone 103, or tablet 104. The universal applications may be distributed using traditional methods, such as on CD/DVD 105 or using other physical media. An end-user device, such as personal computer 102, may load the application from the CD/DVD 105 using a disk drive or other media reader.

Alternatively or additionally, application publisher 101 may load the universal applications to a server 106 that is hosted by the publisher or a third party. An end-user device, such as smartphone 103, may access the server 106 via a public or private network 107 and download the universal applications. In another embodiment, application publisher 101 may provide universal applications to an application store 108' and/or a third party application store 110', which may be, for example, hosted on a widely available cloud service. An end-user device, such as tablet 104, may access the application store 108' and/or the third party application store 110' via network 107 and download desired universal applications.

Another application publisher 109 may develop universal applications that are associated with the universal applications created by publisher 101. For example, application publisher 109 may create universal applications that comprise optional, add-on content for a main gaming universal application developed by publisher 101. Application publisher 109 may provide the optional universal application to application store 108' and/or third party application store 110'. If the user on device 104 desires the additional content, then that user may access the application store 108 and/or third party application store 110 and download the optional universal application. Each application package on the application store 108' and/or third party application store 110' may be identified with a unique package name, SKU, or other identifier.

It will be understood that main and optional universal applications may be distributed to end-user devices in any number ways now known or later developed and that the system shown in FIG. 1 is simplified for illustration purposes. Moreover, in addition to the end-user devices illustrated in FIG. 1, any other end-user device may access, download, and run universal applications composed of one or more sub-component universal applications. Furthermore, additional application publishers or developers may provide universal applications to application store 108' and/or or third party application store 110' or to other application stores accessible via network 107 or any other private or public network (not shown).

Figure 2:
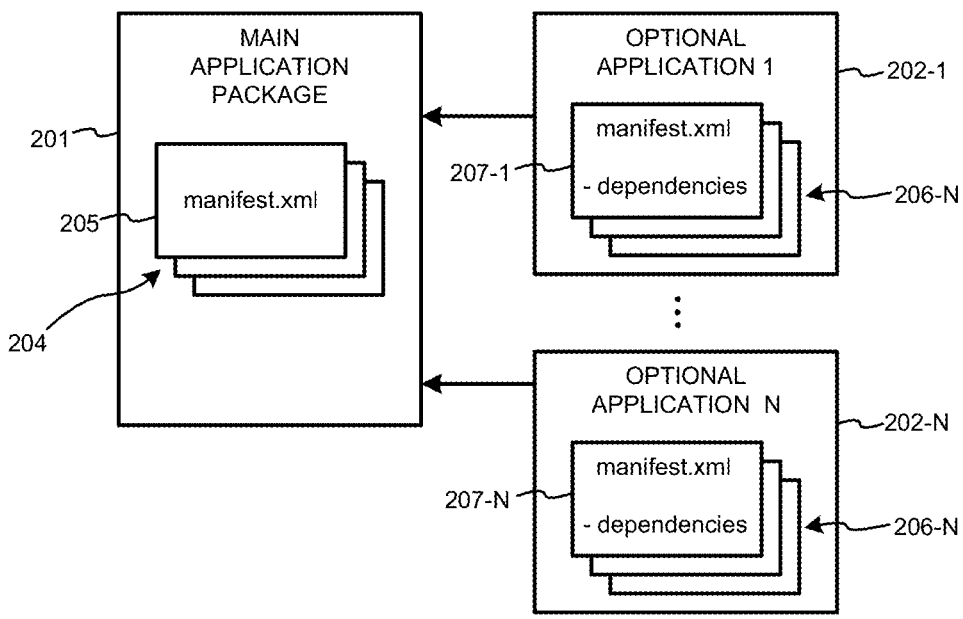
FIG. 2 is a block diagram illustrating an example of universal applications composed of one or more sub-component universal applications.

FIG. 2 is a block diagram illustrating an example universal applications composed of one or more sub-component universal applications that may be downloaded from third party application stores, such as third party application store 110 (FIG. 1). A device loads a main universal application package 201 and may load one or more optional application packages 202, 203. The main application package 201 comprises a group of application files 204, including an application manifest 205. The application manifest 205 may be, for example, an XML file that describes the contents of main application package 201 and specifies how the contents 204 of the package are mapped into a directory structure.

The XML manifest 205 contains three sections in one embodiment—package metadata, package contents, and package layouts. The package metadata is a key/value store, where the keys are strings and the values are strings. The package contents describe the files 204 that comprise the package 201. The package layouts map content resources to a particular layout of files and directories. The XML manifest file 205 may be named according to the appropriate convention for the device or platform, such as "platform.xml" or "manifest.xml". However, the XML manifest can be any file in the archive 204 as long as the relationship points to the XML manifest file and the XML manifest file conforms to the schema.

Optional application packages 202 also comprise application files 206, which include an application manifest 207. Application files 206 and application manifest 207 in the optional application packages 202 are similar to the corresponding files in main application package 201. However, the application manifest in optional application packages 202 include code or text identifying dependencies to main application package 201 and/or to other main application packages.

The following text illustrates an example element from the manifest file in an optional application package. The element begins with the <Dependencies>start-tag, and ends with the </Dependencies>end-tag. This element defines the main package dependency for the optional package.

<Dependencies>
     <TargetDeviceFamily Name="Windows.Universal" MinVersion="10.0.14000.0" MaxVersionTested="12.0.0.0"/>
     <uap3:MainPackageDependency Name="MyApp.Main" Publisher="MyMainPublisher"/>
   </Dependencies>

The Dependencies element includes attributes to identify the target device family, the main package, and the main application publisher associated with the optional application package. The publisher attribute is optional. If no publisher value is specified, then the publisher for the dependency is assumed to the publisher of the optional application package.

It is possible to identify multiple target device families, main applications, and publishers in the Dependencies element. This allows one optional application package to work with different types of main applications or different version of the same main application.

The presence of the Dependencies element tells the system that the identified main application must be present. If the appropriate main application is not present, then the system will not load or run the optional application package. The main application must be loaded before the system will register the dependent optional application packages.

The optional application package may be encrypted. If the main application is loaded and the optional application package has the appropriate Dependencies element, then the system will decrypt the optional application package at run time as it is used.

With universal applications, developers can release an application and provide additional content, either with the initial release or at a later time. The additional content may be in the form of an optional application package that can be acquired as an in-application purchase or as a purchase from an application store. The optional application package may be, for example, downloadable content (DLC) for a gaming application; free support data, such as mapping data, for the main application; or data that is specific to a set of hardware capabilities for a particular end-user device. By providing universal applications that are composed of one or more sub-component universal applications, users save time, bandwidth, and disk storage while getting the best application experience that developers can provide.

By including the one or more sub-component universal applications, developers can portion out their application into application packages and content packages, which allows users to download the content on demand as it is needed. Additionally, application publishers can release an application and subsequently release some DLC or optional content without having to release an update to the main application itself. Instead, developers can build a separate content package that can be submitted to the application store and acquired by users.

In one embodiment, developers may convert existing applications with built-in optional content to a main universal application and one or more sub-component universal applications that comprise the optional content. The user experience impact for sub-component universal applications will be the same as for traditional applications having a single package. Similarly, there is no impact on performance when comparing the sub-componentized universal applications to traditional single-package applications.

The sub-componentized universal applications allow developers to manage (e.g., enumerate, update, license) all content on the user's behalf. Developers can add new and/or updated content to an application by releasing a new optional application package without having to rebuild the main application and without impacting the main application. The optional application package content follows the same licensing rules as the main application (e.g. concurrency, sharing, revocation, and ceasing distribution). The optional content can be licensed separately from the main application itself.

Application content is always dynamic using the sub-componentized universal applications. If a system configuration changes, then new content for that configuration can be downloaded. Likewise, content that is no longer needed can be removed following a configuration change.

Existing applications do not have the ability to pull unique sub-content entities into that main application. The improvement disclosed herein is the ability to create a universal application that is made up of multiple packages. The separate packages may be DLLs, content, or other applications that are downloadable and able to be consumed by the main application that was originally downloaded. And at runtime the sub-component or optional applications are seen as part of the main application. The optional applications have their own entitlements. Entitlements are the rights and privileges associated with an application package. They have their own licensing, they are uniquely identified in the application store, and they have a unique package name.

Figure 3:
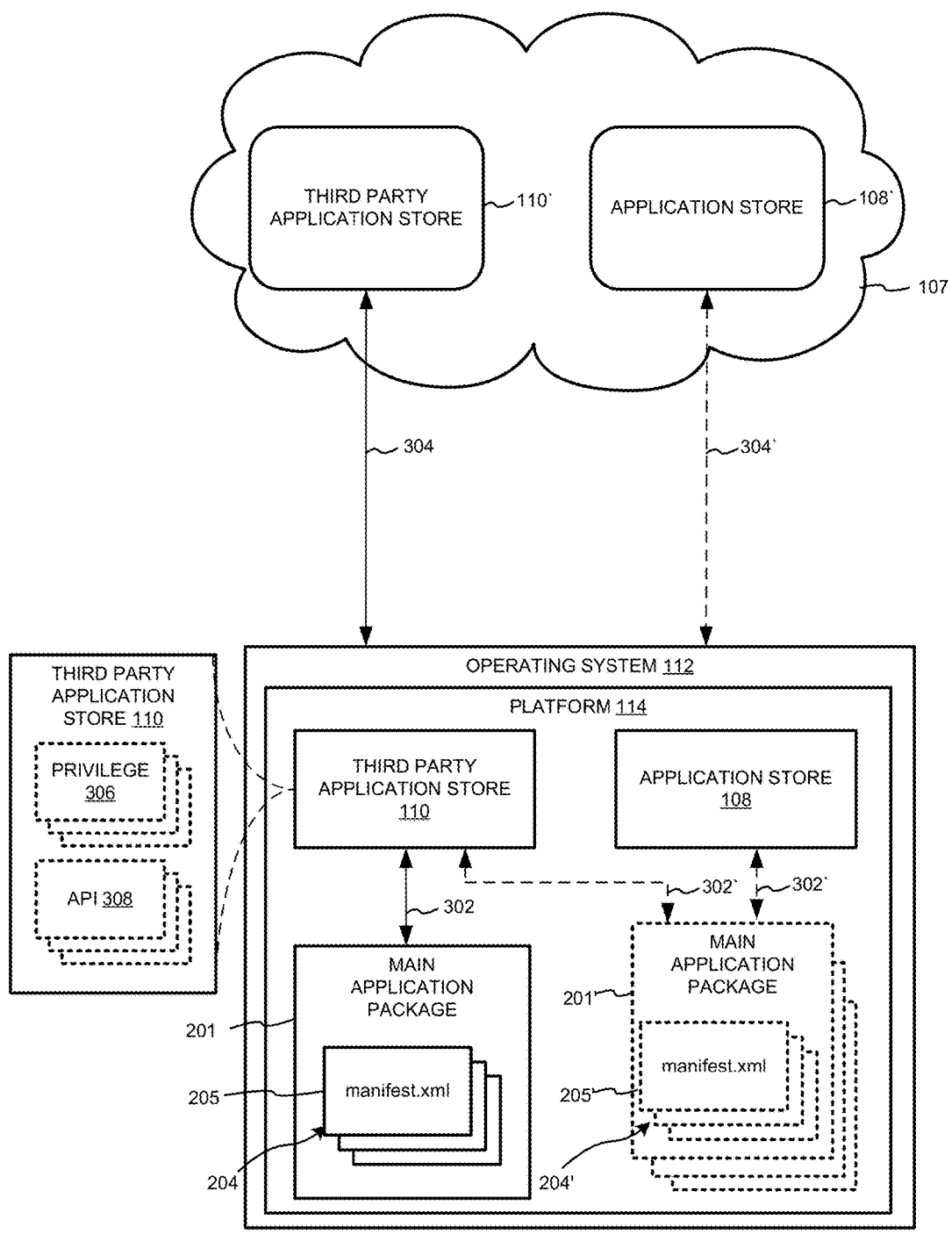
FIG. 3 is a block diagram illustrating an example of integrating a third party application store with an operating system of a device.

FIG. 3 is a conceptual diagram illustrating integration of a third party application store, such as third party application store 110, with an operating system 112 of a device. For example, third party application store 110 and application store 108, operating on one of end-user devices 102, 103, or 104, may access the third party application store 110' and application store 108', respectively, via network 107 and download desired universal applications (e.g., Universal Windows Applications).

In an implementation, platform 114 may identify one or more application stores and one or more applications operating on the device. For example, the one or more application stores, such as third party application store 110 and application store 108, are configured as a respective source for each application 201 operating on the device. In this example, main application package 201 is linked 302 to third party application store 110, which is identified as the respective source for main application package 201. Similarly, the one or more other applications, such as main application packages 201', may be linked 302' to either third party application store 110 or application store 108. Moreover, the device and/or operating system 112, via platform 114, may communicate 304 with third party application store 110 when performing one or more application store-specific operations for third party application store 110. Similarly, the device and/or operating system 112, via platform 114, may communicate 304' with third party application store 110 when performing one or more application store-specific operations for application store 108.

Platform 114 may determine one or more application store privileges 306 for each of the one or more application stores operating on the device. For example, each application store privilege 306 provides third party application store 110 with management capabilities over respective applications, such as main application package 201. Further, platform 114 may perform, for each application store, one or more operations specific to the application store based on the one or more application store privileges 306 and one or more APIs 308 specific to the application store. Platform 114 may perform one or more application store-specific operations related to at least application development and packaging, installation and updating of applications, remediation of applications, in-application deployment related actions, telemetry for applications, and OOBE.

In an implementation, platform 114 may perform application store-specific operations related to package installation and updating. For example, platform 114 may identifying all application packages on the device and determine the one or more application stores (e.g., third party application store 110) configured as the respective source for each of the application packages 201 and/or 201' on the device.

Further, platform 114 may download an application package (e.g., 201 and/or 201') via the one or more application stores (e.g., third party application store 110), the application package corresponding to at least an application package update or an application package install. Platform 114 may determine whether a previous version of the application package (e.g., 201 and/or 201') is located in the device. Platform 114 may determine an applicability configuration for the application package (e.g., 201 and/or 201'). Platform 114 may determine whether a policy allows either the installation or updating of the application package (e.g., 201 and/or 201') based on a system configuration of the device. Then, platform 114 may install the application package (e.g., 201 and/or 201') based on a determination that the previous version of the application is not located in the device, determining the application configuration for the application package (e.g., 201 and/or 201'), and a determination that the policy allows for installation of the application package (e.g., 201 and/or 201'). Otherwise, platform 114 may update the application package (e.g., 201 and/or 201') based on a determination that the previous version of the application is located in the device, determining the application configuration for the application package (e.g., 201 and/or 201'), and a determination that the policy allows for updating of the application package (e.g., 201 and/or 201').

In an implementation, platform 114 may perform application store-specific operations related to package downloading. For example, platform 114 may enable one of the application stores (e.g., third party application store 110) to begin a respective download operation for each application. Platform 114 may then configure the one or more application stores (e.g., third party application store 110) to create an application tile for each application currently engaged in the respective download operation. Platform 114 may provide the one or more application stores (e.g., third party application store 110) with pause and resume abilities for each of the respective download operations.

Further, platform 114 may enable the one or more application stores (e.g., third party application store 110) to identify a plurality of paused download operations, and to resume the plurality of paused download operations. Moreover, platform 114 may enable the one or more application stores (e.g., third party application store 110) to assign a priority indicator for each respective download operation based on one or more priority factors.

In an implementation, platform 114 may perform application store-specific operations related to stage user data. For example, platform 114 may integrate each of the one or more application stores (e.g., third party application store 110) such that they provides a communication link to one or more user data source locations.

In an implementation, platform 114 may perform application store-specific operations related to device applicability. For example, platform 114 may enable the one or more application stores (e.g., third party application store 110) to detect at least a new language or a scale asset on the device. Platform 114 may then trigger the one or more application stores (e.g., third party application store 110) to update the one or more applications based on detecting at least the new language or the scale asset on the device.

In an implementation, platform 114 may perform application store-specific operations related to device inventory. For example, platform 114 may configure the one or more application stores (e.g., third party application store 110) to identify one or more applications on the device. Platform 114 may enable each of the one or more application stores (e.g., third party application store 110) to determine whether any of the one or more applications on the device are sourced from the respective application store (e.g., third party application store 110).

In an implementation, platform 114 may perform application store-specific operations related to package remediation. For example, platform 114 may detect an activation error corresponding to one of the one or more applications on the device. Platform 114 may then detect a user input on a tile corresponding to the application. Platform 114 may then present an error indication to the user of the device in response to detecting the user input on the tile corresponding to the application. Platform 114 may then access the respective application store (e.g., third party application store 110) corresponding to the application. The respective application store (e.g., third party application store 110) may present error information to the user, the error information include at least additional information corresponding to the activation error and solutions to the activation error.

In an implementation, platform 114 may perform application store-specific operations related to package install. For example, platform 114 may configure each of the one or more applications to perform at least one of identifying one or more available updates for the respective application, determining a priority level of an update, the update including an application package (e.g., 201 and/or 20F) of the respective application, determining application store specific information for the update corresponding to the application package (e.g., 201 and/or 20F) of the respective application, downloading the update in a background state of the device, installing the update on the device in response to completing downloading of the update, configuring the update to download and install in a foreground state of the device, determining all required updates for the respective application.

In an implementation, platform 114 may perform application store-specific operations related to application data synchronizing. For example, platform 114 may configure each of one or more applications to synchronize application data based at least on one of a high priority data roaming indication, a typical data roaming indication, and a device specific data roaming indication.

In an implementation, platform 114 may perform application store-specific operations related to OOBE. For example, platform 114 may restore at least one of the one or more applications or application data corresponding to the one or more applications based on one of the one or more application stores (e.g., third party application store 110), the at least one of the one or more applications being downloaded from a first application store (e.g., application store 108) different from a second application store.

In an implementation, platform 114 may perform application store-specific operations related to telemetry for applications. For example, platform 114 may provide application crash and usage telemetry data for the one or more applications on the device to the one or more application stores.

Figure 4:
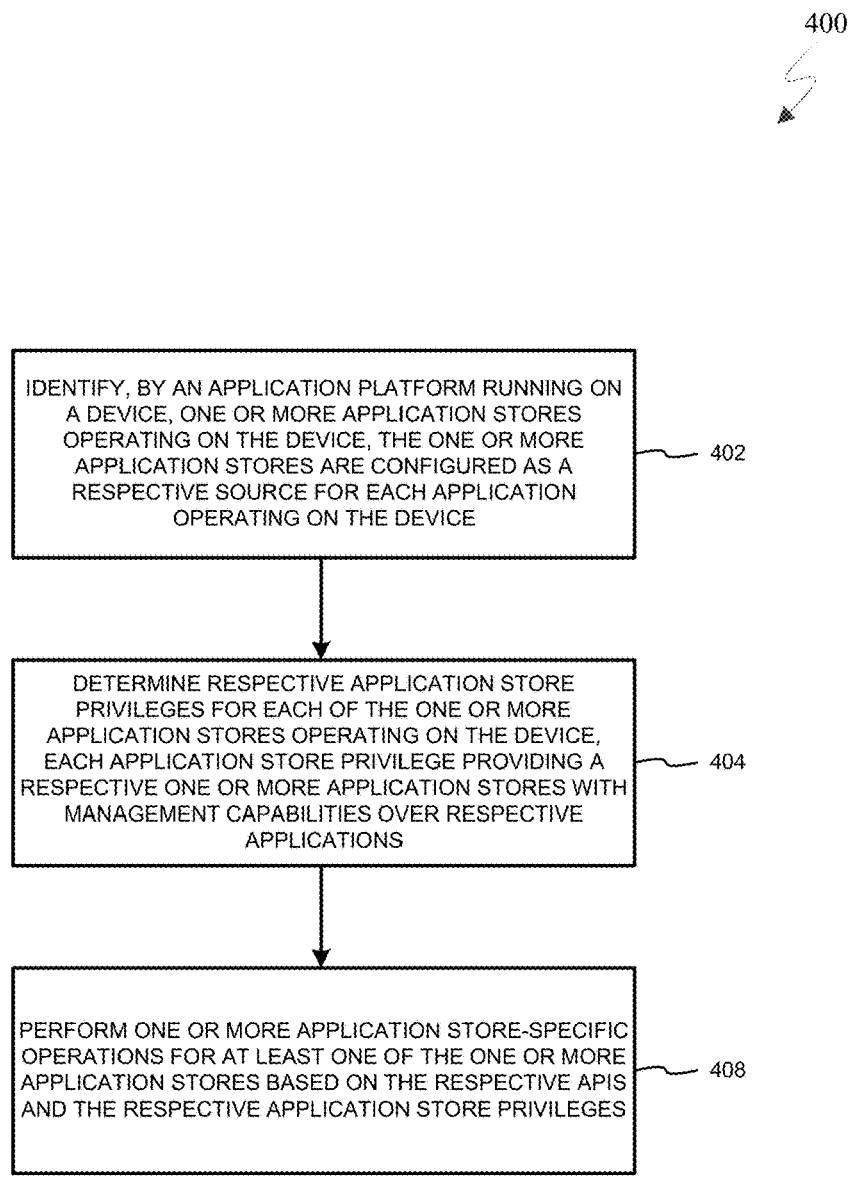
FIG. 4 is a flowchart illustrating a computer-implemented method for integrating a third party application store with an operating system of a device according to an example embodiment.

FIG. 4 is a flow diagram illustrating examples of a method 400 related to redundancy generation of polar codes during wireless communications in accordance with various implementations of the present disclosure. Although the operations described below are presented in a particular order and/or as being performed by an example component, it should be understood that the ordering of the actions and the components performing the actions may be varied, depending on the implementation. Also, although the platform 114 (FIG. 3) is illustrated as having a number of subcomponents, it should be understood that one or more of the illustrated subcomponents may be separate from, but in communication with, the platform 114 (FIG. 3), and/or each other. Moreover, it should be understood that any of actions or components described below with respect to the platform 114 (FIG. 3) and/or its subcomponents may be performed by a specially-programmed processor, such as processor circuit 510 (FIG. 5), a processor executing specially-programmed software or computer-readable media, or by any other combination of a hardware component and/or a software component specially configured for performing the described actions or components.

In an implementation, at block 402, the method 400 may identifying, by an application platform operating on a device, one or more application stores and one or more applications operating on the device, the one or more application stores being configured as a respective source for each application operating on the device. In an implementation, for example, the device, such as a personal computer 102, smartphone 103, or tablet 104, and/or platform 114 to identify one or more application stores and one or more applications (e.g., 201 and/or 201') operating on the device, the one or more application stores (e.g., application store 108 and/or third party application store 110) are configured as a respective source for each application (e.g., 201 and/or 201') operating on the device.

In some implementations, the one or more application stores include at least one third party application store 110 for platform-homogenous applications.

In some implementations, each of the one or more application stores (e.g., application store 108 and/or third party application store 110) provides a communication link to one or more user data source locations.

In an implementation, at block 404, the method 400 may determine one or more application store privileges for each of the one or more application stores operating on the device, each application store privilege providing a respective application store with management capabilities over the one or more applications. In an implementation, for example, the device, such as a personal computer 102, smartphone 103, or tablet 104, and/or platform 114 to determine one or more application store privileges for each of the one or more application stores (e.g., application store 108 and/or third party application store 110) operating on the device, each application store privilege 306 providing a respective one or more application stores (e.g., application store 108 and/or third party application store 110) with management capabilities over respective applications (e.g., 201 and/or 201').

In an implementation, platform 114 may optionally manage respective APIs for each of the one or more application stores. In an implementation, for example, the device, such as a personal computer 102, smartphone 103, or tablet 104, and/or platform 114 to manage respective APIs 308 for each of the one or more application stores (e.g., application store 108 and/or third party application store 110).

In an implementation, at block 406, the method 400 may perform, for each application store, one or more operations specific to the application store based on the one or more application store privileges and one or more APIs specific to the application store. In an implementation, for example, the device, such as a personal computer 102, smartphone 103, or tablet 104, and/or platform 114 to perform, for each application store (e.g., application store 108 and/or third party application store 110), one or more operations specific to the application store (e.g., application store 108 and/or third party application store 110, respectively) based on the one or more application store privileges 306 and one or more APIs 308 specific to the application store (e.g., application store 108 and/or third party application store 110, respectively).

In some implementations, platform 114 may identify all application packages on the device, and determine the one or more application stores (e.g., application store 108 and/or third party application store 110) configured as the respective source for each of the application packages (e.g., 201 and/or 20F) on the device.

In some implementations, platform 114 may download an application package via the one or more application stores (e.g., application store 108 and/or third party application store 110), the application package corresponding to at least an application package update or an application package install, determine whether a previous version of the application package is located in the device, determine an applicability configuration for the application package, determine whether a policy allows either the installation or updating of the application package based on a system configuration of the device, install the application package based on a determination that the previous version of the application is not located in the device, determining the application configuration for the application package, and a determination that the policy allows for installation of the application package, and update the application package based on a determination that the previous version of the application is located in the device, determining the application configuration for the application package, and a determination that the policy allows for updating of the application package.

In some implementations, platform 114 may enable one of the application stores (e.g., application store 108 and/or third party application store 110) to begin a respective download operation for each application, configuring the one or more application stores (e.g., application store 108 and/or third party application store 110) to create an application tile for each application currently engaged in the respective download operation, and provide the one or more application stores (e.g., application store 108 and/or third party application store 110) with pause and resume abilities for each of the respective download operations.

In some implementations, platform 114 may enable the one or more application stores (e.g., application store 108 and/or third party application store 110) to identify a plurality of paused download operations, and enable the one or more application stores (e.g., application store 108 and/or third party application store 110) to resume the plurality of paused download operations.

In some implementations, platform 114 may enable the one or more application stores (e.g., application store 108 and/or third party application store 110) to assign a priority indicator for each respective download operation based on one or more priority factors.

In some implementations, platform 114 may enable the one or more application stores (e.g., application store 108 and/or third party application store 110) to detect at least a new language or a scale asset on the device, and trigger the one or more application stores (e.g., application store 108 and/or third party application store 110) to update the one or more applications based on detecting at least the new language or the scale asset on the device.

In some implementations, platform 114 may configure the one or more application stores (e.g., application store 108 and/or third party application store 110) to identify one or more applications on the device, and enable each of the one or more application stores (e.g., application store 108 and/or third party application store 110) to determine whether any of the one or more applications on the device are sourced from the respective application store (e.g., application store 108 and/or third party application store 110).

In some implementations, platform 114 may detect an activation error corresponding to one of the one or more applications on the device, detect a user input on a tile corresponding to the application, present an error indication to the user of the device in response to detecting the user input on the tile corresponding to the application, access the respective application store (e.g., application store 108 and/or third party application store 110) corresponding to the application, and present, via the respective application store (e.g., application store 108 and/or third party application store 110), error information to the user, the error information include at least additional information corresponding to the activation error and solutions to the activation error.

In some implementations, platform 114 may identify one or more available updates for the respective application, determine a priority level of an update, the update including an application package of the respective application, determine application store specific information for the update corresponding to the application package of the respective application, download the update in a background state of the device, install the update on the device in response to completing downloading of the update, configure the update to download and install in a foreground state of the device, and determine all required updates for the respective application.

In some implementations, platform 114 may configure each of one or more applications to synchronize application data based at least on one of a high priority data roaming indication, a typical data roaming indication, and a device specific data roaming indication.

In some implementations, platform 114 may restore at least one of the one or more applications or application data corresponding to the one or more applications based on one of the one or more application stores (e.g., application store 108 and/or third party application store 110), the at least one of the one or more applications being downloaded from a first application store (e.g., application store 108 and/or third party application store 110) different from a second application store (e.g., application store 108 and/or third party application store 110).

In some implementations, platform 114 may provide application crash and usage telemetry data for the one or more applications on the device to the one or more application stores (e.g., application store 108 and/or third party application store 110).

Figure 5:
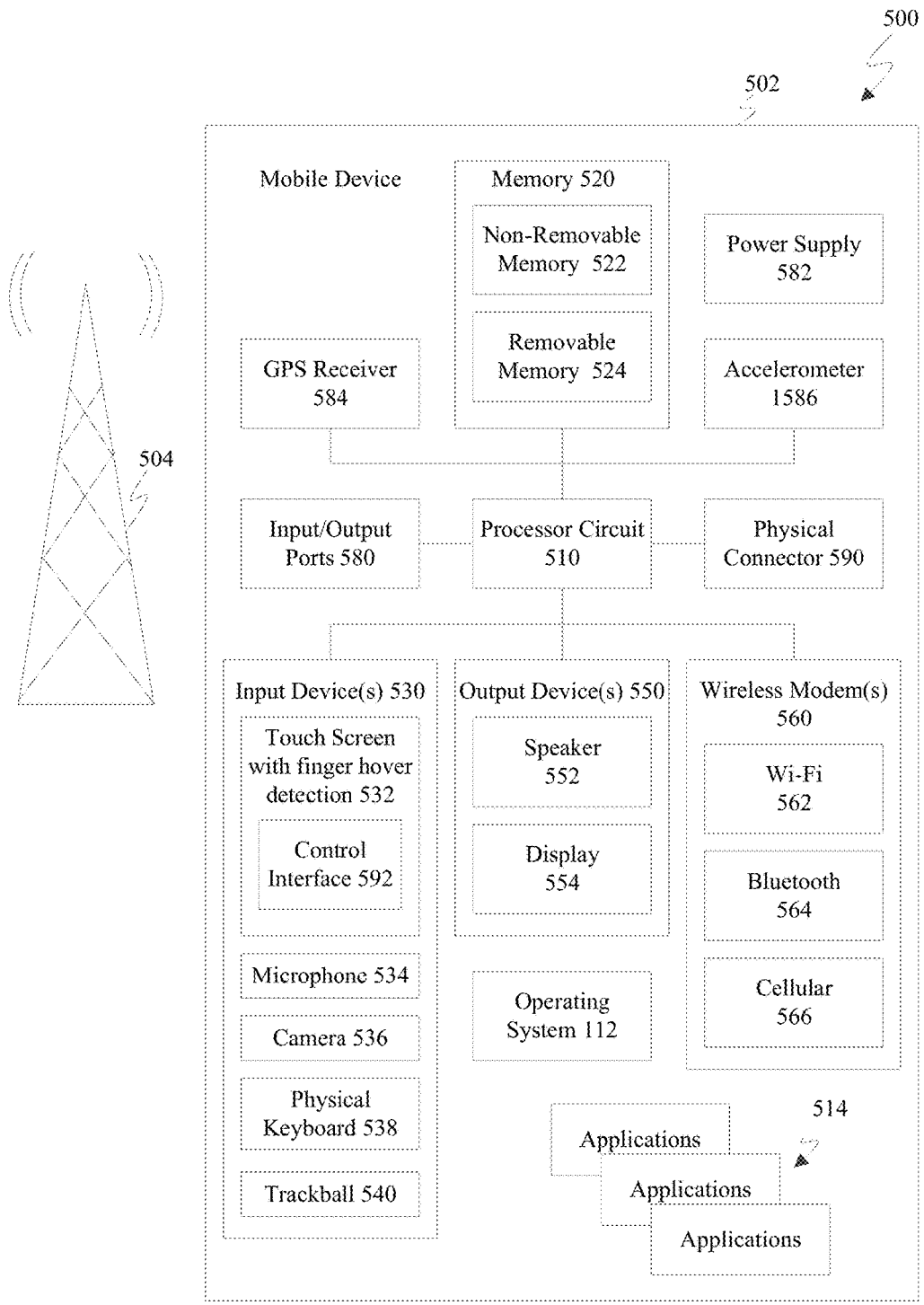
FIG. 5 is a block diagram of an example mobile device that may be used to implement various examples.

FIG. 5 is a block diagram 500 of an exemplary mobile device 502 that may implement examples described herein. For example, mobile device 502 may be used to implement end-user devices, such as a personal computer 102, smartphone 103, or tablet 104, each of which may include an operating system 112 and platform 114. As shown in FIG. 5, mobile device 502 includes a variety of optional hardware and software components, shown generally as components 502. Any component in mobile device 502 can communicate with any other component, although not all connections are shown for ease of illustration. Mobile device 502 can be any of a variety of mobile devices described or mentioned elsewhere herein or otherwise known (e.g., cell phone, smartphone, handheld computer, Personal Digital Assistant (PDA), etc.) and can allow wireless two-way communications with one or more mobile devices over one or more communications networks 504, such as a cellular or satellite network, or with a local area or wide area network.

For instance, components 502 of mobile device 502 are examples of components that may be included in end-user devices, such as a personal computer 102, smartphone 103, or tablet 104, each of which may include an operating system 112 and platform 114. Any number and combination of the features/elements of components 502 may be included in a mobile device example, as well as additional and/or alternative features/elements, as would be known to persons skilled in the relevant art(s). Such features/elements may also be included in stationary device examples.

Mobile device 502 can include a controller or processor referred to as processor circuit 510 for performing such tasks as signal coding, image processing, data processing, input/output processing, power control, and/or other functions. Processor circuit 510 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 510 may execute program code stored in a computer readable medium, such as program code of one or more applications 514, operating system 512, any program code stored in memory 120, etc. Operating system 512 can control the allocation and usage of the components 102 and support for one or more application programs 514 (a.k.a. applications, "apps", etc.), corresponding to applications 201 and/or 20'. Application programs 514 can include common mobile computing applications (e.g., email applications, calendars, contact managers, web browsers, messaging applications) and any other computing applications (e.g., word processing applications, mapping applications, media player applications).

As illustrated, mobile device 502 can include memory 520. Memory 520 can include non-removable memory 522 and/or removable memory 524. The non-removable memory 522 can include RAM, ROM, flash memory, a hard disk, or other well-known memory storage technologies. The removable memory 524 can include flash memory or a Subscriber Identity Module (SIM) card, which is well known in GSM communication systems, or other well-known memory storage technologies, such as "smart cards." The memory 520 can be used for storing data and/or code for operating or running the operating system 512 and the applications 514. Example data can include web pages, text, images, sound files, video data, or other data sets to be sent to and/or received from one or more network servers or other devices via one or more wired or wireless networks. Memory 520 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 520. These programs include operating system 512, one or more application programs 514, and other program modules and program data. Examples of such application programs or program modules may include, for example, computer program logic (e.g., computer program code or instructions) for implementing, operating system 112, platform 114, and/or further examples described herein.

Mobile device 502 can support one or more input devices 530, such as a touch screen 532, microphone 534, camera 536, physical keyboard 538 and/or trackball 540 and one or more output devices 550, such as a speaker 552 and a display 554. Touch screens, such as touch screen 532, can detect input in different ways. For example, capacitive touch screens detect touch input when an object (e.g., a fingertip) distorts or interrupts an electrical current running across the surface. As another example, touch screens can use optical sensors to detect touch input when beams from the optical sensors are interrupted. Physical contact with the surface of the screen is not necessary for input to be detected by some touch screens. For example, the touch screen 532 may be configured to support finger hover detection using capacitive sensing, as is well understood in the art. Other detection techniques can be used, as already described above, including camera-based detection and ultrasonic-based detection. To implement a finger hover, a user's finger is typically within a predetermined spaced distance above the touch screen, such as between 0.1 to 0.25 inches, or between 0.0.25 inches and 0.05 inches, or between 0.0.5 inches and 0.75 inches or between 0.75 inches and 1 inch, or between 1 inch and 1.5 inches, etc.

The touch screen 532 is shown to include a control interface 592 for illustrative purposes. The control interface 592 is configured to control content associated with a virtual element that is displayed on the touch screen 532. In an example, the control interface 592 is configured to control content that is provided by one or more of applications 514. For instance, when a user of the mobile device 502 utilizes an application, the control interface 592 may be presented to the user on touch screen 532 to enable the user to access controls that control such content. Presentation of the control interface 592 may be based on (e.g., triggered by) detection of a motion within a designated distance from the touch screen 532 or absence of such motion. Examples for causing a control interface (e.g., control interface 592) to be presented on a touch screen (e.g., touch screen 532) based on a motion or absence thereof are described in greater detail below.

Other possible output devices (not shown) can include piezoelectric or other haptic output devices. Some devices can serve more than one input/output function. For example, touch screen 532 and display 554 can be combined in a single input/output device. The input devices 530 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 512 or applications 514 can comprise speech-recognition software as part of a voice control interface that allows a user to operate the device 1500 via voice commands. Further, mobile device 502 can comprise input devices and software that allows for user interaction via a user's spatial gestures, such as detecting and interpreting gestures to provide input to a gaming application.

Wireless modem(s) 560 can be coupled to antenna(s) (not shown) and can support two-way communications between processor circuit 510 and external devices, as is well understood in the art. The modem(s) 560 are shown generically and can include a cellular modem 566 for communicating with the mobile communication network 504 and/or other radio-based modems (e.g., Bluetooth 564 and/or Wi-Fi 562). Cellular modem 566 may be configured to enable phone calls (and optionally transmit data) according to any suitable communication standard or technology, such as GSM, 3G, 4G, 5G, etc. At least one of the wireless modem(s) 560 is typically configured for communication with one or more cellular networks, such as a GSM network for data and voice communications within a single cellular network, between cellular networks, or between the mobile device and a public switched telephone network (PSTN).

Mobile device 502 can further include at least one input/output port 580, a power supply 582, a satellite navigation system receiver 584, such as a Global Positioning System (GPS) receiver, an accelerometer 586, and/or a physical connector 590, which can be a USB port, IEEE 1394 (FireWire) port, and/or RS-232 port. The illustrated components 502 are not required or all-inclusive, as any components can be not present and other components can be additionally present as would be recognized by one skilled in the art.

Figure 6:
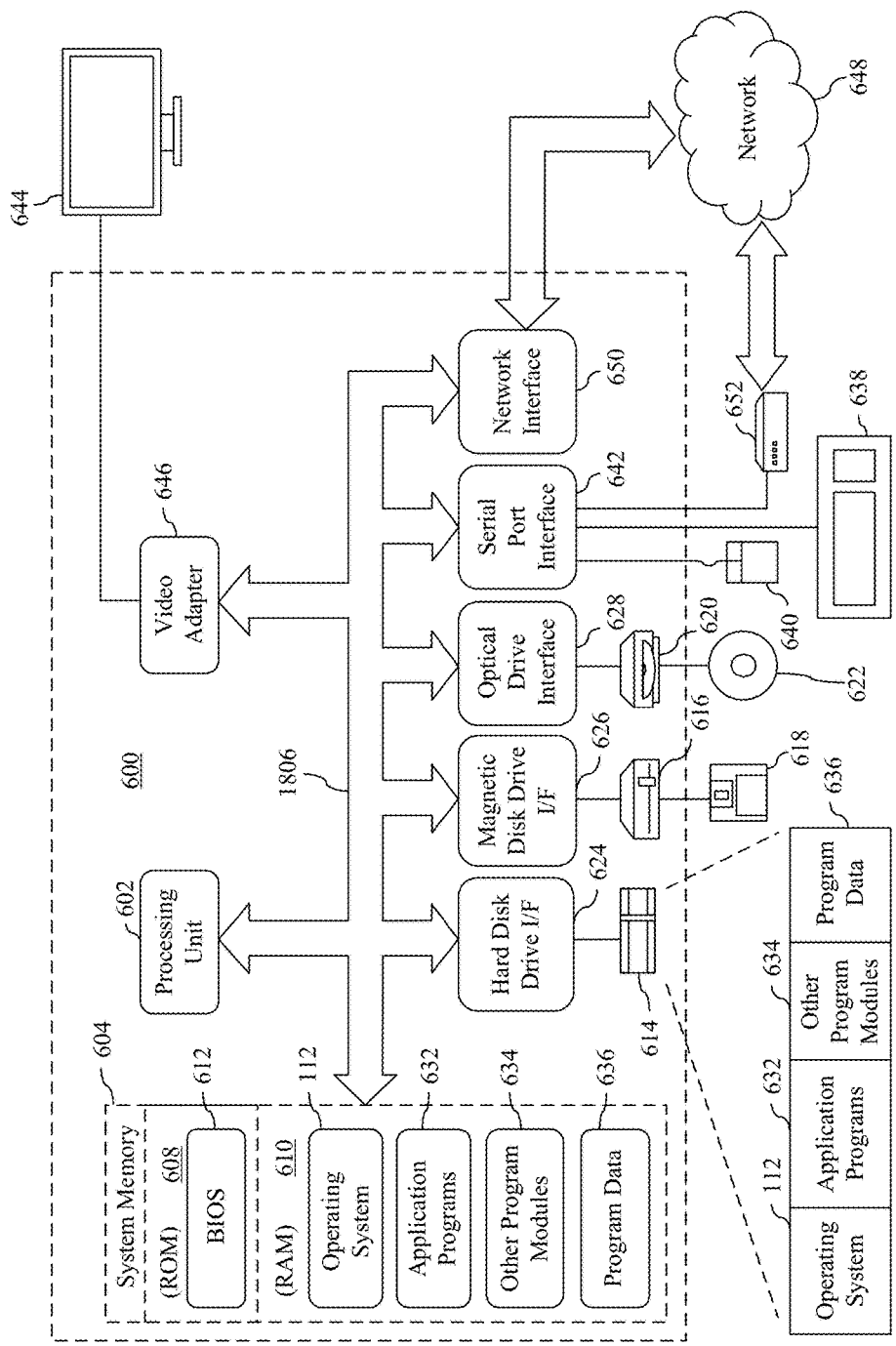
FIG. 6 is a block diagram of an example processor-based computer system that may be used to implement various examples.

FIG. 6 depicts an example processor-based computer system 600 that may be used to implement various examples described herein. For example, system 600 may be used to implement end-user devices, such as a personal computer 102, smartphone 103, or tablet 104, each of which may include an operating system 112 and platform 114. System 60 may also be used to implement any of the steps of any of flowchart 400, as described above. The description of system 600 provided herein is provided for purposes of illustration, and is not intended to be limiting. Examples may be implemented in further types of computer systems, as would be known to persons skilled in the relevant art(s).

As shown in FIG. 6, system 600 includes a processing unit 602, a system memory 604, and a bus 606 that couples various system components including system memory 604 to processing unit 602. Processing unit 602 may comprise one or more circuits, microprocessors or microprocessor cores. Bus 606 represents one or more of any of several types of bus structures, including a memory bus or memory controller, a peripheral bus, an accelerated graphics port, and a processor or local bus using any of a variety of bus architectures. System memory 604 includes read only memory (ROM) 608 and random access memory (RAM) 610. A basic input/output system 612 (BIOS) is stored in ROM 608.

System 600 also has one or more of the following drives: a hard disk drive 614 for reading from and writing to a hard disk, a magnetic disk drive 616 for reading from or writing to a removable magnetic disk 618, and an optical disk drive 66 for reading from or writing to a removable optical disk 622 such as a CD ROM, DVD ROM, BLU-RAY™ disk or other optical media. Hard disk drive 614, magnetic disk drive 616, and optical disk drive 66 are connected to bus 606 by a hard disk drive interface 624, a magnetic disk drive interface 626, and an optical drive interface 628, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 112, one or more application programs 632, corresponding to applications 201 and/or 20F, other program modules 634, and program data 636. In accordance with various examples, the program modules may include computer program logic that is executable by processing unit 602 to perform any or all of the functions and features of end-user devices, such as a personal computer 102, smartphone 103, or tablet 104, each of which may include an operating system 112 and platform 114. The program modules may also include computer program logic that, when executed by processing unit 1802, causes processing unit 1802 to perform any of the steps of any of flowchart 400, as described above.

A user may enter commands and information into system 600 through input devices such as a keyboard 638 and a pointing device 640 (e.g., a mouse). Other input devices (not shown) may include a microphone, joystick, game controller, scanner, or the like. In one example, a touch screen is provided in conjunction with a display 644 to allow a user to provide user input via the application of a touch (as by a finger or stylus for example) to one or more points on the touch screen. These and other input devices are often connected to processing unit 602 through a serial port interface 642 that is coupled to bus 606, but may be connected by other interfaces, such as a parallel port, game port, or a universal serial bus (USB). Such interfaces may be wired or wireless interfaces.

Display 644 is connected to bus 606 via an interface, such as a video adapter 1846. In addition to display 644, system 600 may include other peripheral output devices (not shown) such as speakers and printers.

System 600 is connected to a network 648 (e.g., a local area network or wide area network such as the Internet) through a network interface 650, a modem 652, or other suitable means for establishing communications over the network. Modem 652, which may be internal or external, is connected to bus 606 via serial port interface 642.

As used herein, the terms "computer program medium," "computer-readable medium," and "computer-readable storage medium" are used to generally refer to memory devices or storage structures such as the hard disk associated with hard disk drive 614, removable magnetic disk 618, removable optical disk 622, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Examples are also directed to such communication media.

As noted above, computer programs and modules (including application programs 632 and other program modules 634) may be stored on the hard disk, magnetic disk, optical disk, ROM, or RAM. Such computer programs may also be received via network interface 650, serial port interface 642, or any other interface type. Such computer programs, when executed or loaded by an application, enable system 600 to implement features of examples discussed herein. Accordingly, such computer programs represent controllers of the system 600. Examples are also directed to computer program products comprising software stored on any computer useable medium. Such software, when executed in one or more data processing devices, causes a data processing device(s) to operate as described herein. Examples may employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

In one example, a method comprises identifying, by an application platform operating on a device, one or more application stores and one or more applications operating on the device, the one or more application stores being configured as a respective source for each application operating on the device; determining one or more application store privileges for each of the one or more application stores operating on the device, each application store privilege providing a respective application store with management capabilities over the one or more applications; managing respective application program interfaces (APIs) for each of the one or more application stores; and performing, for each application store, one or more operations specific to the application store based on the one or more application store privileges and one or more application program interfaces (APIs) specific to the application store.

In an example, the one or more application stores include at least one third party application store for platform-homogenous applications.

In an example, performing, for each application store, the one or more operations specific to the application store based on the one or more application store privileges and the one or more APIs specific to the application store further comprises: identifying all application packages on the device; and determining the one or more application stores configured as the respective source for each of the application packages on the device.

In an example, performing, for each application store, the one or more operations specific to the application store based on the one or more application store privileges and the one or more APIs specific to the application store further comprises: downloading an application package via the one or more application stores, the application package corresponding to at least an application package update or an application package install; determining whether a previous version of the application package is located in the device; determining an applicability configuration for the application package; determining whether a policy allows either the installation or updating of the application package based on a system configuration of the device; installing the application package based on a determination that the previous version of the application is not located in the device, determining the application configuration for the application package, and a determination that the policy allows for installation of the application package; and updating the application package based on a determination that the previous version of the application is located in the device, determining the application configuration for the application package, and a determination that the policy allows for updating of the application package.

In an example, performing, for each application store, the one or more operations specific to the application store based on the one or more application store privileges and the one or more APIs specific to the application store further comprises at least one of: enabling, by the application platform operating on the device, one of the one or more application stores to begin a respective download operation for each application; configuring the one or more application stores to create an application tile for each application currently engaged in the respective download operation; or providing the one or more application stores with pause and resume abilities for each of the respective download operations.

In an example, performing, for each application store, the one or more operations specific to the application store based on the one or more application store privileges and the one or more APIs specific to the application store further comprises: enabling the one or more application stores to identify a plurality of paused download operations; and enabling the one or more application stores to resume the plurality of paused download operations.

In an example, performing, for each application store, the one or more operations specific to the application store based on the one or more application store privileges and the one or more APIs specific to the application store further comprises: enabling the one or more application stores to assign a priority indicator for each respective download operation based on one or more priority factors.

In an example, each of the one or more application stores provides a communication link to one or more user data source locations.

In an example, performing, for each application store, the one or more operations specific to the application store based on the one or more application store privileges and the one or more APIs specific to the application store further comprises: enabling the one or more application stores to detect at least a new language or a scale asset on the device; and triggering the one or more application stores to update the one or more applications based on detecting at least the new language or the scale asset on the device.

In an example, performing, for each application store, the one or more operations specific to the application store based on the one or more application store privileges and the one or more APIs specific to the application store further comprises: configuring the one or more application stores to identify one or more applications on the device; and enabling each of the one or more application stores to determine whether any of the one or more applications on the device are sourced from the respective application store.

In an example, the method further comprises: detecting an activation error corresponding to one of the one or more applications on the device; detecting a user input on a tile corresponding to the application; presenting an error indication to the user of the device in response to detecting the user input on the tile corresponding to the application; accessing the respective application store corresponding to the application; and presenting, via the respective application store, error information to the user, the error information include at least additional information corresponding to the activation error and solutions to the activation error.

In an example, the method further comprises configuring, by the application platform, each of one or more applications to perform at least one of: identifying one or more available updates for the respective application; determining a priority level of an update, the update including an application package of the respective application; determining application store specific information for the update corresponding to the application package of the respective application; downloading the update in a background state of the device; installing the update on the device in response to completing downloading of the update; configuring the update to download and install in a foreground state of the device; and determining all required updates for the respective application.

In an example, the method further comprises configuring, by the application platform, each of one or more applications to synchronize application data based on a high priority data roaming indication, a typical data roaming indication, and a device specific data roaming indication.

In an example, the method further comprises restoring, by the application platform, at least one of an application or application data corresponding to the application using one of the one or more application stores, the application being downloaded from an application store different from the one of the one or more application stores.

In an example, the method further comprises providing, by the application platform, application crash and usage telemetry data for one or more applications on the device to the one or more application stores.

What is claimed is:

1. A method, comprising:
   identifying, by a universal application platform operating on a device, one or more application stores and one or more applications operating on the device, the one or more application stores being configured as a respective source for each application operating on the device, wherein the universal application platform provides a guaranteed core application program interface (API) for the device;
   determining one or more application store privileges for each of the one or more application stores operating on the device, each application store privilege providing a respective application store with management capabilities over the one or more applications, wherein the one or more application stores includes at least one third party application store with management capabilities over the one or more applications operating on the universal application platform;
   managing respective APIs for each of the one or more application stores; and
   performing, for each application store, one or more operations specific to the application store based on the one or more application store privileges and one or more APIs specific to the application store.

2. The method of claim 1, wherein the at least one third party application store includes platform-homogenous applications.

3. The method of claim 1, wherein performing, for each application store, the one or more operations specific to the application store based on the one or more application store privileges and the one or more APIs specific to the application store further comprises:
   identifying all application packages on the device; and
   determining the one or more application stores configured as the respective source for each of the application packages on the device.

4. The method of claim 1, wherein performing, for each application store, the one or more operations specific to the application store based on the one or more application store privileges and the one or more APIs specific to the application store further comprises:
   downloading an application package via the one or more application stores, the application package corresponding to at least an application package update or an application package install;
   determining whether a previous version of the application package is located in the device;
   determining an applicability configuration for the application package;
   determining whether a policy allows either the installation or updating of the application package based on a system configuration of the device;
   installing the application package based on a determination that the previous version of the application package is not located in the device, determining the application configuration for the application package, and a determination that the policy allows for installation of the application package; and
   updating the application package based on a determination that the previous version of the application is located in the device, determining the application configuration for the application package, and a determination that the policy allows for updating of the application package.

5. The method of claim 1, wherein performing, for each application store, the one or more operations specific to the application store based on the one or more application store privileges and the one or more APIs specific to the application store further comprises at least one of:
   enabling, by the universal application platform operating on the device, one of the one or more application stores to begin a respective download operation for each application;
   configuring the one or more application stores to create an application tile for each application currently engaged in the respective download operation; or
   providing the one or more application stores with pause and resume abilities for each of the respective download operations.

6. The method of claim 1, wherein performing, for each application store, the one or more operations specific to the application store based on the one or more application store privileges and the one or more APIs specific to the application store further comprises:
   enabling the one or more application stores to identify a plurality of paused download operations; and
   enabling the one or more application stores to resume the plurality of paused download operations.

7. The method of claim 1, wherein performing, for each application store, the one or more operations specific to the application store based on the one or more application store privileges and the one or more APIs specific to the application store further comprises:
   enabling the one or more application stores to assign a priority indicator for each respective download operation based on one or more priority factors.

8. The method of claim 1, wherein each of the one or more application stores provides a communication link to one or more user data source locations.

9. The method of claim 1, wherein performing, for each application store, the one or more operations specific to the application store based on the one or more application store privileges and the one or more APIs specific to the application store further comprises:
   enabling the one or more application stores to detect at least a new language or a scale asset on the device; and
   triggering the one or more application stores to update the one or more applications based on detecting at least the new language or the scale asset on the device.

10. The method of claim 1, wherein performing, for each application store, the one or more operations specific to the application store based on the one or more application store privileges and the one or more APIs specific to the application store further comprises:
    configuring the one or more application stores to identify the one or more applications on the device; and
    enabling each of the one or more application stores to determine whether any of the one or more applications on the device are sourced from the respective application store.

11. The method of claim 1, further comprising:
    detecting an activation error corresponding to one of the one or more applications on the device;
    detecting a user input on a tile corresponding to the one of the one or more applications;
    presenting an error indication to the user of the device in response to detecting the user input on the tile corresponding to the application;
    accessing the respective application store corresponding to the application; and
    presenting, via the respective application store, error information to the user, the error information include at least additional information corresponding to the activation error and solutions to the activation error.

12. The method of claim 1, further comprising configuring, by the universal application platform, each of one or more applications to perform at least one of:
    identifying one or more available updates for the respective application;
    determining a priority level of an update, the update including an application package of the respective application;
    determining application store specific information for the update corresponding to the application package of the respective application;
    downloading the update in a background state of the device;
    installing the update on the device in response to completing downloading of the update;
    configuring the update to download and install in a foreground state of the device; or
    determining all required updates for the respective application.

13. An apparatus, comprising:
    a memory; and a processor coupled to the memory and configured to:
identify, by a universal application platform operating on a device, one or more application stores and one or more applications operating on the device, the one or more application stores being configured as a respective source for each application operating on the device, wherein the universal application platform provides a guaranteed core application program interface (API) for the device;
determine one or more application store privileges for each of the one or more application stores operating on the device, each application store privilege providing a respective application store with management capabilities over the one or more applications, wherein the one or more application stores includes at least one third party application store with management capabilities over the one or more applications operating on the universal application platform;
manage respective APIs for each of the one or more application stores; and
perform, for each application store, one or more operations specific to the application store based on the one or more application store privileges and one or more APIs specific to the application store.

14. The apparatus of claim 13, wherein the at least one third party application store includes platform-homogenous applications.

15. The apparatus of claim 13, wherein the processor configured to perform, for each application store, the one or more operations specific to the application store based on the one or more application store privileges and the one or more APIs specific to the application store is further configured to:
identify all application packages on the device; and
determine the one or more application stores configured as the respective source for each of the application packages on the device.

16. The apparatus of claim 13, wherein the processor configured to perform, for each application store, the one or more operations specific to the application store based on the one or more application store privileges and the one or more APIs specific to the application store is further configured to:
download an application package via the one or more application stores, the application package corresponding to at least an application package update or an application package install;
determine whether a previous version of the application package is located in the device;
determine an applicability configuration for the application package;
determine whether a policy allows either the installation or updating of the application package based on a system configuration of the device;
install the application package based on a determination that the previous version of the application package is not located in the device, determining the application configuration for the application package, and a determination that the policy allows for installation of the application package; and
update the application package based on a determination that the previous version of the application is located in the device, determining the application configuration for the application package, and a determination that the policy allows for updating of the application package.

17. The apparatus of claim 13, wherein the processor configured to perform, for each application store, the one or more operations specific to the application store based on the one or more application store privileges and the one or more APIs specific to the application store is further configured to at least one of:
enable, by the universal application platform operating on the device, one of the one or more application stores to begin a respective download operation for each application;
configure the one or more application stores to create an application tile for each application currently engaged in the respective download operation; or
provide the one or more application stores with pause and resume abilities for each of the respective download operations.

18. The apparatus of claim 13, wherein the processor configured to perform, for each application store, the one or more operations specific to the application store based on the one or more application store privileges and the one or more APIs specific to the application store is further configured to:
enable the one or more application stores to identify a plurality of paused download operations; and
enable the one or more application stores to resume the plurality of paused download operations.

19. The apparatus of claim 13, wherein the processor configured to perform, for each application store, the one or more operations specific to the application store based on the one or more application store privileges and the one or more APIs specific to the application store is further configured to:
enable the one or more application stores to assign a priority indicator for each respective download operation based on one or more priority factors.

20. A non-transitory computer-readable medium storing computer executable code, comprising code for:
identifying, by a universal application platform operating on a device, one or more application stores and one or more applications operating on the device, the one or more application stores being configured as a respective source for each application operating on the device, wherein the universal application platform provides a guaranteed core application program interface (API) for the device;
determining one or more application store privileges for each of the one or more application stores operating on the device, each application store privilege providing a respective application store with management capabilities over the one or more applications, wherein the one or more application stores includes at least one third party application store with management capabilities over the one or more applications operating on the universal application platform;
managing respective APIs for each of the one or more application stores; and
performing, for each application store, one or more operations specific to the application store based on the one or more application store privileges and one or more APIs specific to the application store.

* * * * *